(12) United States Patent
Inoue

(10) Patent No.: US 8,831,774 B2
(45) Date of Patent: Sep. 9, 2014

(54) CONVEY CONTROL DEVICE FOR LONG OBJECT

(71) Applicant: Takahiro Inoue, Ibaraki (JP)

(72) Inventor: Takahiro Inoue, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/868,346

(22) Filed: Apr. 23, 2013

(65) Prior Publication Data

US 2013/0289763 A1 Oct. 31, 2013

(30) Foreign Application Priority Data

Apr. 26, 2012 (JP) ................................. 2012-101382

(51) Int. Cl.
| | |
|---|---|
| *G06F 7/00* | (2006.01) |
| *G05D 13/00* | (2006.01) |
| *B41J 15/00* | (2006.01) |
| *B65G 43/00* | (2006.01) |
| *B41J 11/42* | (2006.01) |
| *B41J 11/00* | (2006.01) |
| *B41J 15/16* | (2006.01) |

(52) U.S. Cl.
CPC .............. *B65G 43/00* (2013.01); *B41J 15/005* (2013.01); *B41J 11/002* (2013.01); *B41J 11/42* (2013.01); *B41J 15/165* (2013.01)
USPC ............ 700/230; 700/213; 700/228; 700/304

(58) Field of Classification Search
None
See application file for complete search history.

(56) References Cited

U.S. PATENT DOCUMENTS

| | | | |
|---|---|---|---|
| 2010/0322679 A1* | 12/2010 | Kobayashi et al. ........... | 399/301 |
| 2011/0035037 A1* | 2/2011 | Weber et al. .................... | 700/96 |

FOREIGN PATENT DOCUMENTS

JP 2004-189449 7/2004

* cited by examiner

*Primary Examiner* — Yolanda Cumbess
(74) *Attorney, Agent, or Firm* — Oblon, Spivak, McClelland, Maier & Neustadt, L.L.P.

(57) ABSTRACT

A convey control device for a long object includes an upstream side conveying unit, a buffer unit, a downstream side conveying unit, and a convey control unit. When starting to convey the long object, by a catalyst of starting output of conveying speed information of the long object output after receiving a convey start instruction sent from another device following the downstream side conveying unit, the convey control unit releases the restricting of a driving source of the upstream side conveying unit and the downstream side conveying unit and starts the convey control of the long object.

6 Claims, 10 Drawing Sheets

CONVEY CONTROL DEVICE FOR LONG OBJECT

BACKGROUND OF THE INVENTION

1. Field of the Invention

The present invention relates to a convey control device for a long object, such as a treatment agent applying device used in an inkjet recording system.

2. Description of the Related Art

Recording of images by an inkjet recording method is characterized by features of low noise, low running cost, and the ease of producing color images, and is thus rapidly becoming widely used in recent years. However, when an image is recorded on a recording medium other than exclusive paper, there are problems in the initial quality in terms of blurring, density, color tone, and show-through. Additionally, there are problems relevant to the durability of images such as water resistance and weather resistance. Therefore, proposals have been made to solve these problems.

One method of solving these problems is to improve the image quality by applying a treatment agent having a function of condensing the ink before the ink droplets land on a sheet that is a recording medium.

For example, Patent Document 1 discloses the following. In a recording medium conveying path in a treatment agent applying device, an upstream side conveying unit and a downstream side conveying unit are provided on a conveying direction upstream side and a conveying direction downstream side, respectively. A tension applying unit for applying tension to the recording medium is provided between the upstream side conveying unit and the downstream side conveying unit. According to the changes in the tension applied by the tension applying unit, the conveying speed of the recording medium is controlled.

An example of convey control of a long recording medium with the tension applying unit is described with reference to FIG. 2. FIG. 2 is a schematic diagram of a treatment agent applying device. Detailed configurations and functions of this treatment agent applying device are described in the detailed description of the preferred embodiments.

A treatment agent applying device 101 includes multiple in-feed rollers 1, which are rotatably supported, and which include bearings (not shown) provided at edge parts of the rollers. Accordingly, a conveying path for a recording medium W is secured. A feed-in roller that is rotated by a motor (not shown) is denoted by a reference numeral 2, and a feed-in nip roller 4 is pressed against the feed-in roller 2 via the recording medium W. The recording medium W that is sent out by the feed-in roller 2 and the feed-in nip roller 4 is slightly loosened to form an air loop part AL.

On the conveying direction upstream side of the recording medium W, there is provided an upstream side conveying unit constituted by an in-feed roller 8 rotated by a motor (not shown) and a nip roller 9. On the conveying direction downstream side of the upstream side conveying unit, there is provided a downstream side conveying unit constituted by an out-feed roller 14 rotated by a motor (not shown) and a nip roller 9.

Between the upstream side conveying unit and the downstream side conveying unit, there is provided a first dancer unit 17. On the conveying direction downstream side of the downstream side conveying unit, there is provided a second dancer unit 18. As a brake (hereinafter, "electromagnetic brake X") for holding the first dancer unit 17 and the second dancer unit 18 at a predetermined position is turned OFF, and the first dancer unit 17 hangs down by the recording medium W, when printing starts, tension is applied to the recording medium W passing through applying units 13f, 13r for applying a treatment agent having a function of condensing the ink.

Furthermore, as the electromagnetic brake X for holding the second dancer unit 18 at a predetermined position is turned OFF, and the second dancer unit 18 hangs down by the recording medium W, when printing starts, tension is applied to the recording medium W positioned between the out-feed roller 14 and an inkjet printer. This configuration cancels out the loosening of the recording medium W caused by a speed difference between the treatment agent applying device 101 and the inkjet printer (not shown) provided on the conveying direction downstream side of the of the treatment agent applying device 101.

The treatment agent applying device 101 implements the above tension control at the time of printing. Tension is applied to the recording medium W by the first dancer unit 17 and the second dancer unit 18 based on a print preparation instruction catalyst signal sent from the inkjet printer before printing starts.

In a state where the electromagnetic brake X is turned off and the first dancer unit 17 and the second dancer unit 18 are hanging down by the recording medium W, in a case where the in-feed roller 8 and the nip roller 9 or the out-feed roller 14 and the nip roller 9 have a small holding force, for example, when the first dancer unit 17 draws in, by gravity, the recording medium W from the air loop part AL, and draws in the recording medium W between the out-feed roller 14 and the inkjet printer, the first dancer unit 17 may fall down from the predetermined position.

In order to prevent this, in a state where a brake (hereinafter, "electromagnetic brake Y") for preventing the rollers from rotating is turned on, the in-feed roller 8 and the out-feed roller 14 are in a standby state from when a print preparation instruction catalyst is given to when conveying of the recording medium W starts. When the recording medium W starts to be conveyed, the electromagnetic brake Y is turned off based on a reception catalyst signal of a conveying start instruction from the inkjet printer, so that the in-feed roller 8 and the out-feed roller 14 can be driven.

Then, according to drive signals equal to the conveying speed, which are output to the treatment agent applying device 101 from the inkjet printer, the motors (driving sources) of the feed-in roller 2, the in-feed roller 8, and the out-feed roller 14 are driven, so that the recording medium W starts being conveyed.

Subsequently, the loosening amount of the recording medium W is detected by air loop amount detecting units 19g, 19h, 19i and the driving source of the feed-in roller 2 is controlled, the height position of the first dancer unit 17 is detected by position detecting units 19a, 19b, 19c and the driving source of the in-feed roller 8 is controlled, and the height position of the second dancer unit 18 is detected by position detecting units 19d, 19e, 19f and the driving source of the out-feed roller 14 is controlled.

Furthermore, when stopping the printing, the driving sources of the feed-in roller 2, the in-feed roller 8, and the out-feed roller 14 are stopped based on a reception catalyst signal of a conveying stop instruction from the inkjet printer, and the electromagnetic brake Y is turned on to stop the conveying operation.

That is to say, during a regular stop state, the electromagnetic brake X is turned on and the electromagnetic brake Y is turned off. While applying a tension before printing, the electromagnetic brake X is turned off and the electromagnetic brake Y is turned on. During printing, the electromagnetic brake X is turned off and the electromagnetic brake Y is turned off. By the aforementioned control operations, a predetermined tension is applied to the recording medium W.

As described above, in a state where the electromagnetic brake X of the first dancer unit 17 and the second dancer unit 18 is turned off and the electromagnetic brake Y of the in-feed roller 8 and the out-feed roller 14 is turned on based on a print preparation instruction catalyst signal from the inkjet printer, and the first dancer unit 17 and the second dancer unit 18 hung down and tension is applied to the recording medium W, the treatment agent applying device 101 is in a standby state until conveying is started.

In a case where the electromagnetic brake Y of the in-feed roller 8 and the out-feed roller 14 is turned off to start conveying the recording medium W according to a reception catalyst signal of a conveying start instruction from the inkjet printer, and the driving source of the in-feed roller 8 and the out-feed roller 14 has a property of not having a conveying force unless driving signals greater than a predetermined speed are input, or in a case where there is a time lag until an output start catalyst of the drive signal based on a reception catalyst signal of a conveying start instruction, the in-feed roller 8 and the out-feed roller 14 do not have a conveying force until the in-feed roller 8 and the out-feed roller 14 start to have a conveying force, which means there is a time period during which the in-feed roller 8 and the out-feed roller 14 cannot rotate by themselves.

During this time period, the hanging down first dancer unit 17 or the second dancer unit 18 draws in, by gravity, the recording medium W from the downstream side or the upstream side in the conveying direction. Accordingly, the first dancer unit 17 or the second dancer unit 18 falls down to a lower limit position from a predetermined control position. Thus, tension cannot be applied to the recording medium W.

Furthermore, when stopping printing and decelerating, there is a case where the in-feed roller 8 and the out-feed roller 14 have a property of losing a conveying force when the driving source of the in-feed roller 8 and the out-feed roller 14, which is driven by the drive signals sent from the inkjet printer, becomes slower than a predetermined speed, and a case where there is a time lag from an output stop catalyst of the drive signal sent from the inkjet printer until a conveying stop instruction.

In this case also, until the electromagnetic brake Y of the in-feed roller 8 and the out-feed roller 14 is turned on according to a conveying stop instruction, the in-feed roller 8 and the out-feed roller 14 do not have a conveying force and cannot rotate by themselves, and the hanging down first dancer unit 17 or the second dancer unit 18 draws in, by gravity, the recording medium W from the downstream side or the upstream side in the conveying direction. Accordingly, the first dancer unit 17 or the second dancer unit 18 falls down to a lower limit position from a predetermined control position. Thus, tension cannot be applied to the recording medium W when starting the next conveying operation.

FIG. 10 illustrates a state where the first dancer unit 17 or the second dancer unit 18 has fallen to a lower limit position from a predetermined control position by gravity according to the above described phenomenon.

Patent Document 1: Japanese Laid-Open Patent Publication No. 2004-189449

SUMMARY OF THE INVENTION

The present invention provides a convey control device, in which one or more of the above-described disadvantages are eliminated.

A preferred embodiment of the present invention provides a convey control device for a long object, which is capable of preventing a tension applying unit from falling down to a lower limit position from a predetermined control position such that tension cannot be applied to the recording medium W at the time of starting conveying and stopping conveying, so that the long object can be stably conveyed.

According to an aspect of the present invention, there is provided a convey control device for a long object, the convey control device including an upstream side conveying unit; a buffer unit; a downstream side conveying unit; a convey control unit configured to perform convey control of the long object; and a driving source configured to drive the upstream side conveying unit and the downstream side conveying unit, wherein the upstream side conveying unit, the buffer unit, and the downstream side conveying unit are arranged along a conveying path of the long object from a conveying direction upstream side to a conveying direction downstream side, the upstream side conveying unit and the downstream side conveying unit have a function of sandwiching and conveying the long object, the buffer unit has a function of being hung down by the long object between the upstream side conveying unit and the downstream side conveying unit and cancelling out a loosening amount of the long object with gravity of the buffer unit, the driving source has a function of restricting the driving of the upstream side conveying unit and the downstream side conveying unit, and the convey control unit includes a function of determining a conveying speed of the long object according to conveying speed information of the long object output from another device or another member following the downstream side conveying unit, a function of starting the conveying of the long object according to the conveying speed information of the long object after a convey start instruction is output from the another device or the another member following the downstream side conveying unit, and a function of stopping the conveying of the long object according to a convey stop instruction output from the another device or the another member following the downstream side conveying unit, wherein when starting to convey the long object, by a catalyst of starting output of the conveying speed information of the long object output after receiving the convey start instruction sent from the another device or the another member following the downstream side conveying unit, the convey control unit releases the restricting of the driving source and starts the convey control of the long object.

According to an aspect of the present invention, there is provided a convey control device for a long object, the convey control device including an upstream side conveying unit; a buffer unit; a downstream side conveying unit; a convey control unit configured to perform convey control of the long object; and a driving source configured to drive the upstream side conveying unit and the downstream side conveying unit, wherein the upstream side conveying unit, the buffer unit, and the downstream side conveying unit are arranged along a conveying path of the long object from a conveying direction upstream side to a conveying direction downstream side, the upstream side conveying unit and the downstream side conveying unit have a function of sandwiching and conveying the long object, the buffer unit has a function of being hung down by the long object between the upstream side conveying unit and the downstream side conveying unit and cancelling out a loosening amount of the long object with gravity of the buffer unit, the driving source has a function of restricting the driving of the upstream side conveying unit and the downstream side conveying unit, and the convey control unit includes a function of determining a conveying speed of the long object according to conveying speed information of the long object output from another device or another member following the downstream side conveying unit, a function of starting the conveying of the long object according to the conveying speed information of the long object after a convey start instruction is output from the another device or the another member following the downstream side conveying unit, and a function of stopping the conveying of the long object according to a convey stop instruction output from the another device or the another member following the downstream side conveying unit, wherein before receiving a convey start instruction signal sent from the another device or the another member following the downstream side conveying unit, by a catalyst where the conveying speed information of the long object becomes greater than or equal to a minimum speed at which starting the conveying of the long object becomes possible, the convey control unit releases the restricting of the driving source of the upstream side conveying unit and the downstream side conveying unit and starts the convey control of the long object.

According to an aspect of the present invention, there is provided a convey control device for a long object, the convey control device including an upstream side conveying unit; a buffer unit; a downstream side conveying unit; a convey control unit configured to perform convey control of the long object; and a driving source configured to drive the upstream side conveying unit and the downstream side conveying unit, wherein the upstream side conveying unit, the buffer unit, and the downstream side conveying unit are arranged along a conveying path of the long object from a conveying direction upstream side to a conveying direction downstream side, the upstream side conveying unit and the downstream side conveying unit have a function of sandwiching and conveying the long object, the buffer unit has a function of being hung down by the long object between the upstream side conveying unit and the downstream side conveying unit and cancelling out a loosening amount of the long object with gravity of the buffer unit, the driving source has a function of restricting the driving of the upstream side conveying unit and the downstream side conveying unit, and the convey control unit includes a function of determining a conveying speed of the long object according to conveying speed information of the long object output from another device or another member following the downstream side conveying unit, a function of starting the conveying of the long object according to the conveying speed information of the long object after a convey start instruction is output from the another device or the another member following the downstream side conveying unit, and a function of stopping the conveying of the long object according to a convey stop instruction output from the another device or the another member following the downstream side conveying unit, wherein when stopping conveying the long object, by a catalyst of stopping output of the conveying speed information of the long object output before receiving the convey stop instruction sent from the another device or the another member following the downstream side conveying unit, the convey control unit restricts the driving of the driving source and stops the convey control of the long object.

According to an aspect of the present invention, there is provided a convey control device for a long object, the convey control device including an upstream side conveying unit; a buffer unit; a downstream side conveying unit; a convey control unit configured to perform convey control of the long object; and a driving source configured to drive the upstream side conveying unit and the downstream side conveying unit, wherein the upstream side conveying unit, the buffer unit, and the downstream side conveying unit are arranged along a conveying path of the long object from a conveying direction upstream side to a conveying direction downstream side, the upstream side conveying unit and the downstream side conveying unit have a function of sandwiching and conveying the long object, the buffer unit has a function of being hung down by the long object between the upstream side conveying unit and the downstream side conveying unit and cancelling out a loosening amount of the long object with gravity of the buffer unit, the driving source has a function of restricting the driving of the upstream side conveying unit and the downstream side conveying unit, and the convey control unit includes a function of determining a conveying speed of the long object according to conveying speed information of the long object output from another device or another member following the downstream side conveying unit, a function of starting the conveying of the long object according to the conveying speed information of the long object after a convey start instruction is output from the another device or the another member following the downstream side conveying unit, and a function of stopping the conveying of the long object according to a convey stop instruction output from the another device or the another member following the downstream side conveying unit, wherein before receiving a convey stop instruction signal sent from the another device or the another member following the downstream side conveying unit, by a catalyst where the conveying speed information of the long object becomes less than a minimum speed at which starting the conveying of the long object becomes possible, the convey control unit restricts the driving source of the upstream side conveying unit and the downstream side conveying unit and stops the conveying of the long object.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A convey control device for a long object having a tension applying unit such as a treatment agent applying device according to an embodiment of the present invention has the following features.

The convey control device according to an embodiment of the present invention does not have a configuration in which the driving motors are turned into a drivable state by turning off the electromagnetic brakes Y of the in-feed roller 8 and the out-feed roller 14 in response to a reception catalyst of a convey start instruction from the inkjet printer. Instead, in response to a catalyst where the in-feed roller 8 and the out-feed roller 14, which are driven by drive signals output from the inkjet printer, begin to have a conveying force after receiving a convey start instruction, the electromagnetic brakes Y of the in-feed roller 8 and the out-feed roller 14 are turned off so that the driving motors become drivable and the conveying operation of the treatment agent applying device 101 is started.

Furthermore, the convey control device according to an embodiment of the present invention does not have a configuration in which the driving motors are turned into a non-drivable state by turning on the electromagnetic brakes Y of the in-feed roller 8 and the out-feed roller 14 in response to a reception catalyst of a convey stop instruction from the inkjet printer. Instead, in response to a catalyst where the in-feed roller 8 and the out-feed roller 14, which are driven by drive signals output from the inkjet printer, lose the conveying force, the electromagnetic brakes Y are turned on so that the driving motors cannot be driven (non-drivable).

Figure 1:
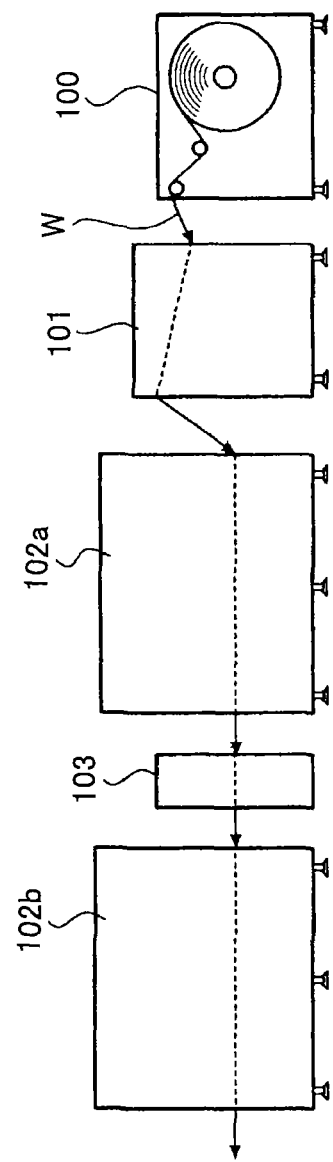
FIG. 1 illustrates the flow of an image forming system according to an embodiment of the present invention.

Next, a description is given, with reference to the accompanying drawings, of embodiments of the present invention. FIG. 1 illustrates the flow of an image forming system according to an embodiment of the present invention.

As illustrated in FIG. 1, a recording medium W such as a long continuous sheet reeled out from a sheet feeding device 100 is first sent into the treatment agent applying device 101, and a treatment agent is applied onto the front side and the back side of the recording medium W, to perform a pre-process. Next, the recording medium W that has been treated is sent to a first inkjet printer 102a, and ink droplets are jetted onto the front side of the recording medium W to form a desired image. Subsequently, the front side and back side of the recording medium W are reversed by a reverse device 103, and then the recording medium W is sent to a second inkjet printer 102b where ink droplets are jetted onto the back side of the recording medium W to form a desired image.

After images are printed onto both sides of the recording medium W as described above, the recording medium W is sent to a post process device (not shown) where a predetermined post process is formed.

Figure 2:
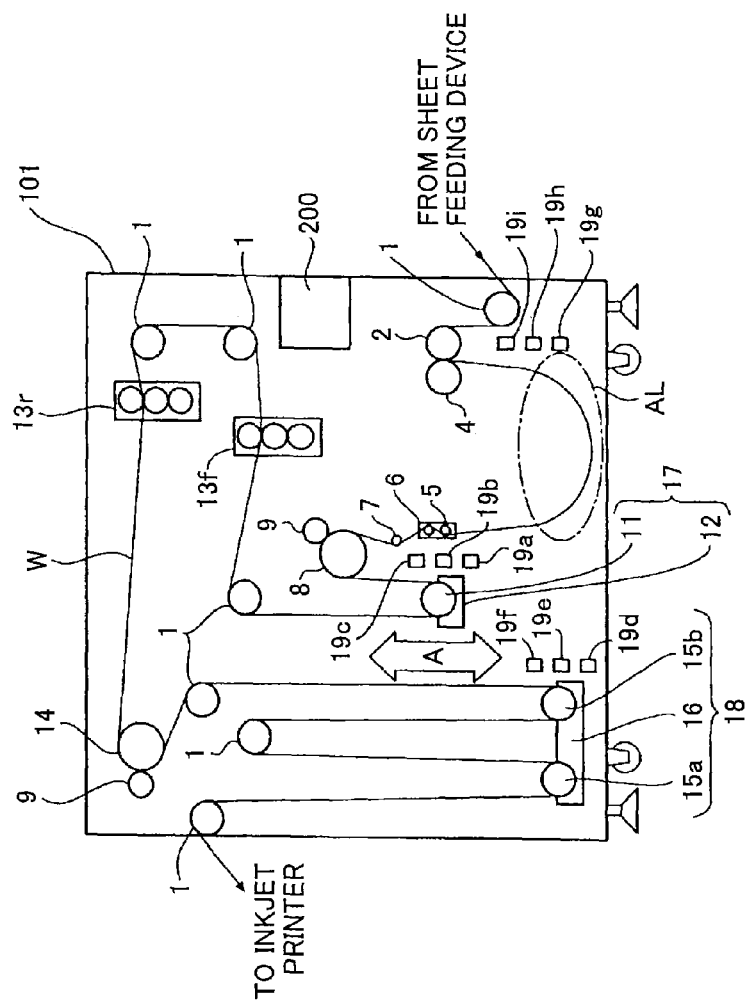
FIG. 2 is a schematic diagram of a treatment agent applying device used in the image forming system illustrated in FIG. 1.

FIG. 2 is a schematic diagram of the treatment agent applying device 101 used in the above image forming system, and illustrates a state where a treatment agent is being applied.

As shown in FIG. 2, the treatment agent applying device 101 includes multiple in-feed rollers 1, which are rotatably supported, and which include bearings (not shown) provided at edge parts of the rollers. Accordingly, a conveying path for a recording medium W is secured.

A feed-in roller that is rotated by a driving source such as a motor (not shown) is denoted by a reference numeral 2, and a feed-in nip roller 4 is pressed against the feed-in roller 2.

The recording medium W is elastically sandwiched by the feed-in roller 2 and the feed-in nip roller 4. By rotating the feed-in roller 2 with the above-described driving source, the recording medium W is drawn inside the treatment agent applying device 101 from the sheet feeding device 100 shown in FIG. 1.

The recording medium W that is sent out by the feed-in roller 2 and the feed-in nip roller 4 is slightly loosened and forms an air loop part AL. The loosening amount in the air loop part AL is monitored by plural air loop amount detecting units 19g, 19h, 19i arranged in the vertical direction, and the feed-in roller 2 is controlled so that the loosening amount is fixed.

The recording medium W that has passed through the air loop part AL passes through a pass shaft 5 and edge guides 6. A pair of edge guides 6 is supported by the pass shaft 5, and the interval between the edge guides 6 are set to be the same as the width of the recording medium W. Therefore, according to the operations of the pass shaft 5 and the edge guides 6, the moving position of the recording medium W in the width direction is restricted, so that the recording medium W moves in a stable manner.

To the recording medium W that has passed through the pass shaft 5 and the edge guides 6, tension is applied for stabilizing the movement, by a tension shaft 7 that is in a fixed state.

Figure 3:
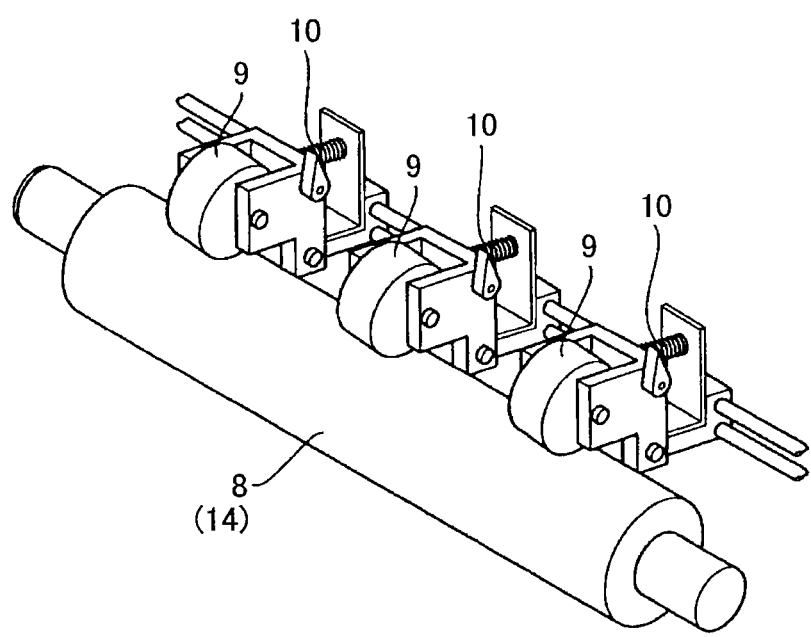
FIG. 3 is a perspective view of a part near an in-feed roller (or an out-feed roller) in the treatment agent applying device.

The recording medium W that has passed through the tension shaft 7 passes through the in-feed roller 8 driven by a driving source such as a motor (not shown) and the nip roller 9. As shown in FIG. 3, a plurality of the nip rollers 9 are arranged along an axial direction of the in-feed roller 8, and the nip rollers 9 are pressed against the in-feed roller 8 by springs 10.

The recording medium W that has passed through the in-feed roller 8 and the nip rollers 9 is wound around a single rotatable first dancer roller 11 from the bottom side. The first dancer roller 11 is rotatably attached to a first movable frame 12 via a bearing (not shown) provided at the roller end part, constituting the first dancer unit 17. Therefore, the first dancer unit 17 is hung down by the recording medium W.

The first dancer unit 17 is movable along a gravity direction (vertical direction) A. In order to detect the position of the first dancer unit 17, plural position detecting units 19a, 19b, 19c are provided in the vertical direction. The driving source of the in-feed roller 8 is controlled according to output from these position detecting units 19a, 19b, 19c, so that the position of the first dancer unit 17 is adjusted to be at a control position.

The recording medium W that has passed through the first dancer unit 17 sequentially passes through the front side applying unit 13f for applying a treatment agent on the front side of the recording medium W and the back side applying unit 13r for applying a treatment agent on the back side of the recording medium W, so that a treatment agent is applied onto both sides of the recording medium W.

The recording medium W that has passed through the back side applying unit 13r passes through the out-feed roller 14 rotated by a driving source such as a motor (not shown) and the nip roller 9. As shown in FIG. 3, a plurality of the nip rollers 9 are arranged along an axial direction of the out-feed roller 14, and the nip rollers 9 are pressed against the out-feed roller 14 by springs 10.

The recording medium W that has passed through the out-feed roller 14 and the nip roller 9 is wound around, in a W shape, second dancer rollers 15a, 15b that are rotatable and the guide roller 1 provided between the second dancer rollers 15a, 15b.

The two second dancer rollers 15a, 15b are rotatably attached to a second movable frame 16 via a bearing (not shown) provided at the roller end parts, constituting the second dancer unit 18. Therefore, the second dancer unit 18 is hung down by the recording medium W.

The second dancer unit 18 is also movable along a gravity direction A. In order to detect the position of the second dancer unit 18, plural position detecting units 19d, 19e, 19f are provided in the vertical direction. The driving source of the out-feed roller 14 is controlled according to output from these position detecting units 19d, 19e, 19f, so that the position of the second dancer unit 18 is adjusted to be at a control position.

The first dancer unit 17 and the second dancer unit 18 are retained at a control position before starting the movement for printing. A description of the control method is omitted.

Figure 4:
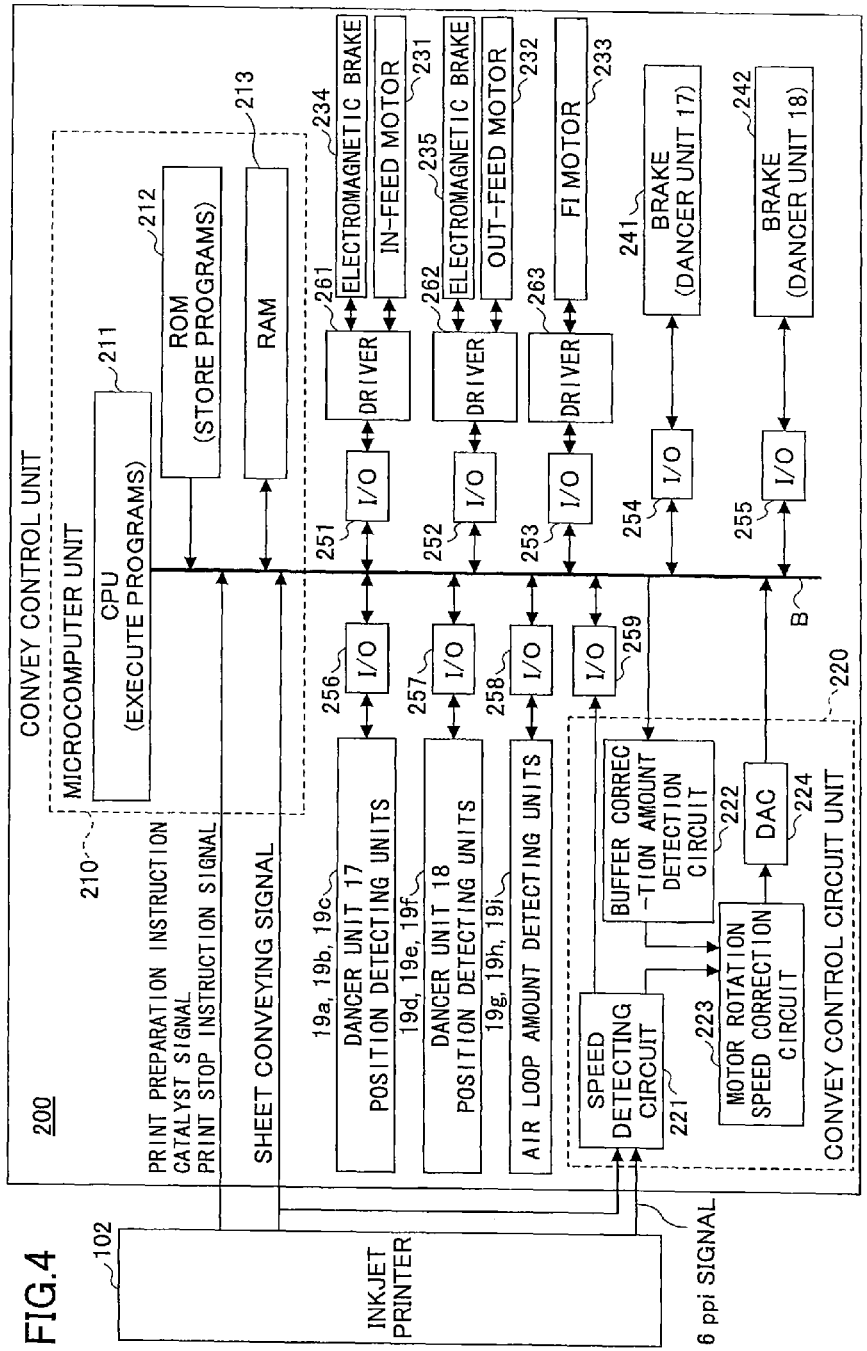
FIG. 4 is a block diagram of a convey control device for implementing convey control of a recording medium performed inside the treatment agent applying device according to an embodiment of the present invention.

FIG. 4 is a block diagram of a convey control device for implementing convey control of the recording medium W performed inside the treatment agent applying device 101.

In order to implement the convey control of the recording medium W described with reference to FIG. 2, the treatment agent applying device 101 includes a convey control unit 200 as illustrated in FIG. 4. As shown in FIG. 4, the convey control unit 200 is mainly constituted by a microcomputer unit 210 and a convey control circuit unit 220. The microcomputer unit 210 and the convey control circuit unit 220 are connected by a bus B.

The microcomputer unit 210 includes a CPU 211 for instructing operations of the treatment agent applying device 101 and performing calculations needed for the operations, a ROM 212 storing various programs executed by the CPU 211, and a RAM 213 for temporarily storing the calculation results.

In the present embodiment, the microcomputer unit 210 particularly implements convey control of the recording medium W and control of the first dancer unit 17 and the second dancer unit 18. Thus, the position detecting units 19a, 19b, 19c for detecting the position of the first dancer unit 17, the position detecting units 19d, 19e, 19f for detecting the position of the second dancer unit 18, and the air loop amount detecting sensor units 19g, 19h, 19i are respectively connected to the microcomputer unit 210 via I/O interfaces 256, 257, and 258 and the bus B.

Furthermore, motors 231, 232, and 233 for driving the in-feed roller 8, the out-feed roller 14, and the feed-in roller 2, and drivers 261, 262, and 263 of the motors 231, 232, and 233 are connected to the microcomputer unit 210 by I/O interfaces 251, 252, and 253 and the bus B.

Furthermore, brakes 241, 242 for controlling whether to make the first dancer unit 17 and the second dancer unit 18 hang down by the recording medium W or to fix the first dancer unit 17 and the second dancer unit 18 at a predetermined position, are also connected to the microcomputer unit 210 via I/O interfaces 254, 255 and the bus B.

The convey control circuit unit 220 is constituted by a speed detecting circuit 221 that receives pulse signals (hereinafter, "6 ppi signals") that are output by the inkjet printer 102 during printing every ⅙ inch conveyance and converts the 6 ppi signals into a motor speed; a buffer correction amount detection circuit 222 that detects the position of the first dancer unit 17, the position of the second dancer unit 18, and the air loop amount, and calculates the correction amount of the motor speed; a motor rotation speed correction circuit 223 that calculates the rotation speed of the motors 231, 232, and 233 according to the speed data from the speed detecting circuit 221 and the correction amount calculated by the buffer correction amount detection circuit 222; and a DAC 224 for setting the motor rotation speed data from the motor rotation speed correction circuit 223.

The speed data detected by the speed detecting circuit 221 is recognized by the microcomputer unit 210 via an I/O interface 259 and the bus B. The rotation speeds of the motors output to the DAC 224 are respectively output to the drivers 261, 262, and 263 via the I/O interfaces 251, 252, and 253 and the bus B, and used for controlling the motors 231, 232, and 233.

As described above, the treatment agent applying device 101 determines a reference speed from speed data calculated based on the 6 ppi signals that are speed data output by the inkjet printer 102, so that the speed of the treatment agent applying device 101 is synchronized with the conveying speed of the inkjet printer 102.

Furthermore, to the driver 261 of the in-feed motor 231 and the driver 262 of the out-feed motor 232, electromagnetic brakes 234, 235 are connected for preventing the rotation of the motors 231, 232.

When the inkjet printer 102 starts printing, the inkjet printer 102 sends a print preparation instruction catalyst signal for starting printing by serial communication to the treatment agent applying device 101, and when print preparation is completed, the inkjet printer 102 activates sheet conveying signals. By a catalyst where these sheet conveying signals have become activated, it becomes possible for the 6 ppi signals to be input to the speed detecting circuit 221, and the conveying motors 231, 232, and 233 begin to be driven.

When the printing is stopped, the sheet conveying signals from the inkjet printer 102 become inactivated so that conveyance is stopped, and the end of the printing operation according to a print stop instruction is reported to the treatment agent applying device 101.

FIGS. 5 through 9 are timing charts for describing convey control. Each chart expresses the timings of print preparation instruction catalyst signals, print stop instruction signals, sheet conveying signals from the inkjet printer 102, drive allowance signals of the in-feed motor 231, drive allowance signals of the out-feed motor 232, the electromagnetic brake 234 of the in-feed motor 231, the electromagnetic brake 235 of the out-feed motor 232, the brake 241 of the first dancer unit 17, the brake 242 of the second dancer unit 18, the 6 ppi signals output from the inkjet printer 102, and the drive signals of the in-feed motor 231 and the out-feed motor 232.

Figure 5:
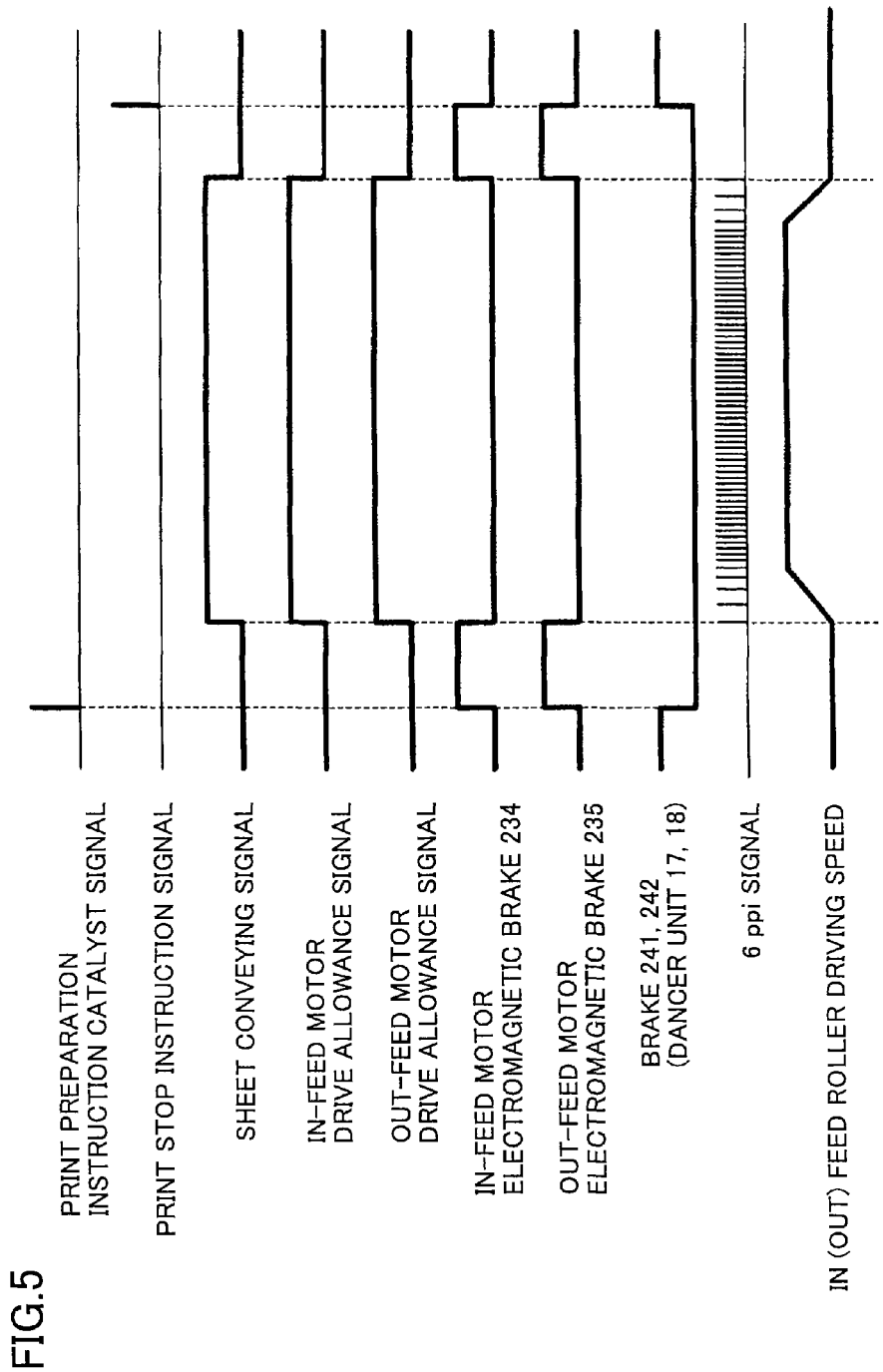
FIG. 5 is a timing chart for describing regular convey control.

Among these timing charts, FIG. 5 is a timing chart for describing regular convey control. This timing chart indicates the convey control of the in-feed roller 8 and the first dancer unit 17, and the convey control of the out-feed roller 14 and the second dancer unit 18 during a regular printing operation. As the same control is implemented for both of these convey control operations, in the following description, the convey control of the in-feed roller 8 and the first dancer unit 17 is taken as an example.

As shown in FIG. 5, before printing is started, the treatment agent applying device 101 is stopped in a state where the electromagnetic brake 234 for preventing rotation of the in-feed motor 231 is turned off, and the brake 241 for retaining the first dancer unit 17 at a predetermined position is turned on.

In this state, the electromagnetic brake 234 of the in-feed motor 231 is turned on and the brake 241 of the first dancer unit 17 is turned off by a print preparation instruction catalyst signal output from the inkjet printer 102, and the first dancer unit 17 is hung down by the recording medium W.

When print preparation is completed, the inkjet printer 102 activates the sheet convey signals, and by this catalyst, the treatment agent applying device 101 recognizes that the inkjet printer 102 has started to convey the recording medium W, the electromagnetic brake 234 of the in-feed motor 231 is turned off, the drive allowance signals of the in-feed motor 231 are activated, and the 6 ppi signals from the inkjet printer 102 become possible to be received, and the drive control of the in-feed roller 8 described with reference to FIG. 4 is started.

Furthermore, when printing is stopped, the inkjet printer 102 inactivates the sheet conveying signals, and by this catalyst, the treatment agent applying device 101 recognizes that the inkjet printer 102 has stopped conveying the recording medium W, the electromagnetic brake 234 of the in-feed motor 231 is turned on, the drive allowance signals of the in-feed motor 231 are inactivated, and the driving of the in-feed roller 8 is stopped. Subsequently, by a print stop instruction from the inkjet printer 102, the electromagnetic brake 234 of the in-feed motor 231 is turned off, the brake 241 for retaining the first dancer unit 17 at a predetermined position is turned on, and the treatment agent applying device 101 returns to the state before printing.

Figure 6:
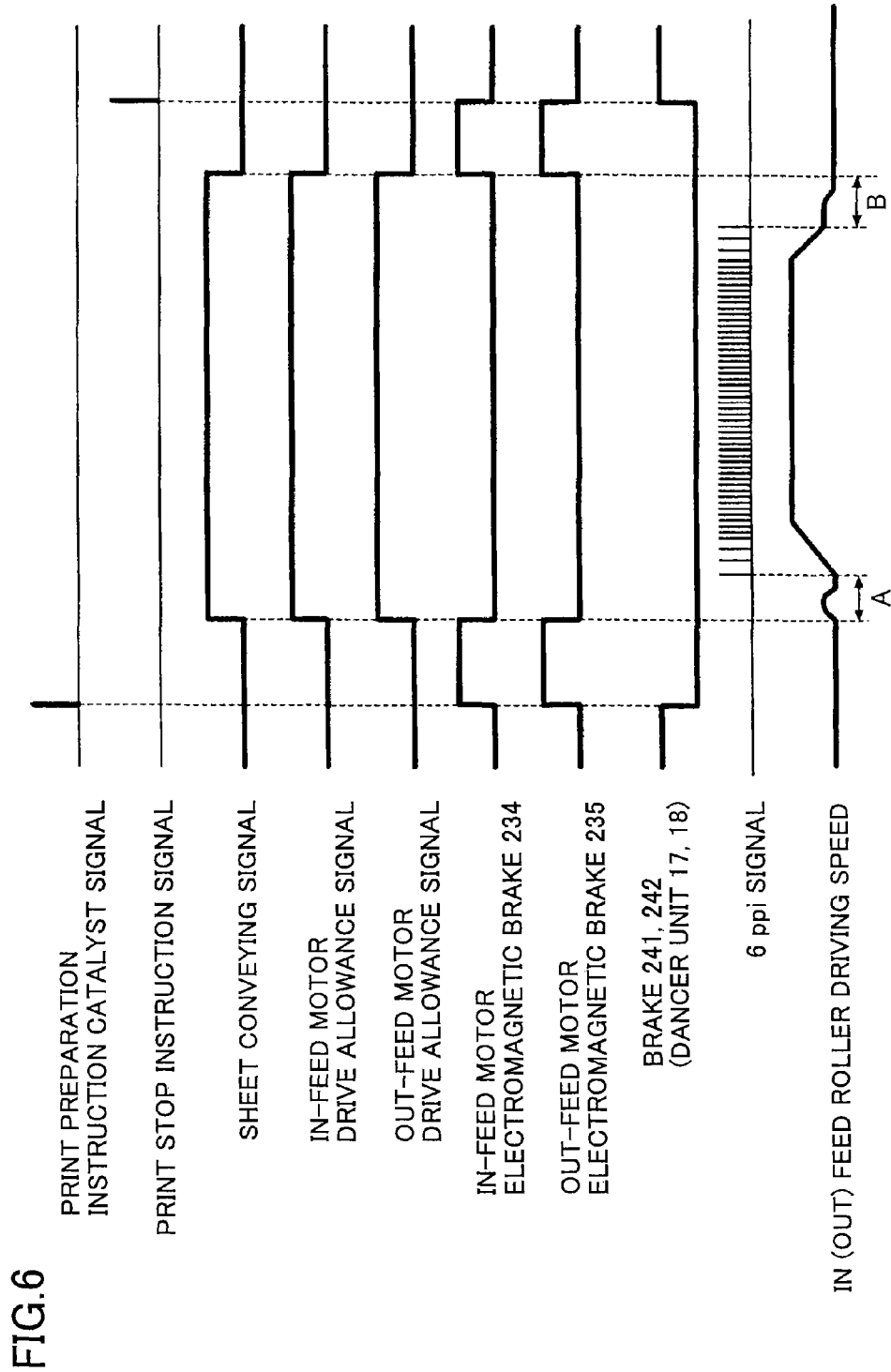
FIG. 6 is a timing chart indicating an example of convey control in which a problem occurs.

FIG. 6 is a timing chart indicating an example of convey control in which a problem occurs.

Due to a condition of the inkjet printer 102, there are cases where the sheet conveying signals have been activated but conveying of a sheet is not immediately started, and there is a time lag from a sheet conveying signal activation catalyst to when conveying is actually started and output of 6 ppi signals is started (see period A in FIG. 6).

In this case, during the period (period A) from when the sheet conveying signals are activated to when the 6 ppi signals are output, the in-feed roller 8 and the out-feed roller 14 do not have a conveying force, and the electromagnetic brakes 234, 235 of the in-feed motor 231 and the out-feed motor 232 and the brakes 241, 242 of the first dancer unit 17 and the second dancer unit 18 are turned off, but the 6 ppi signals are not input to the convey control circuit unit 220 illustrated in FIG. 4.

Figure 10:
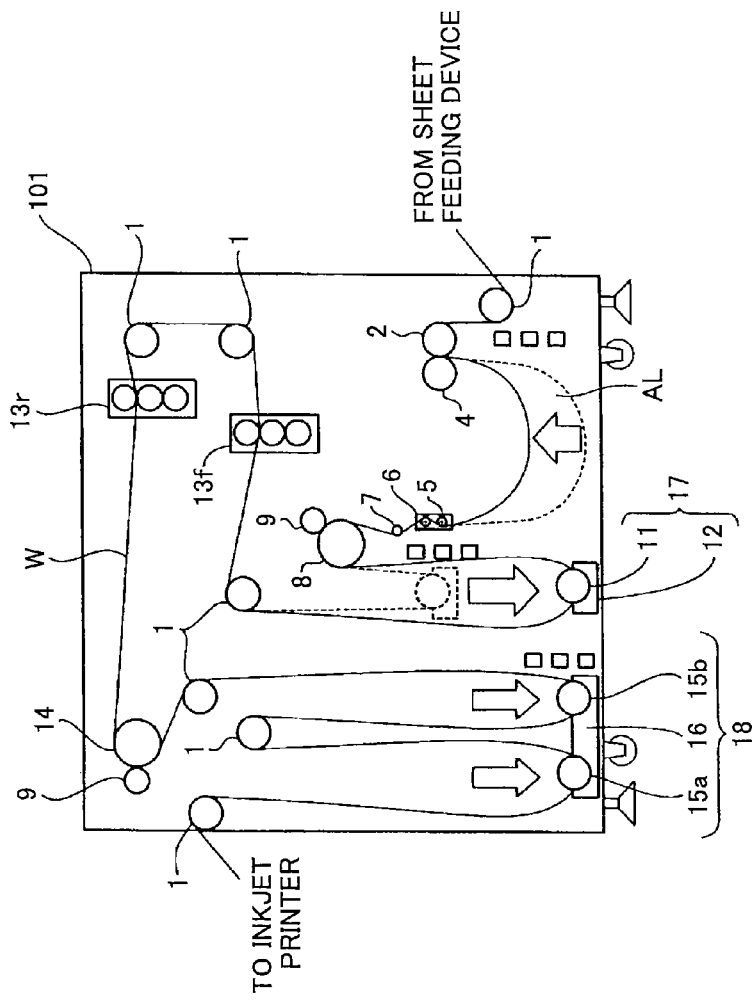
FIG. 10 is a schematic diagram of the treatment agent applying device for describing the problem to be solved by an embodiment of the present invention.

Thus, the in-feed roller 8 cannot rotate by itself, and therefore as shown in FIG. 10, as the hanging down first dancer unit 17 draws in, by gravity, the recording medium W from the air loop part AL that does not have tension on the upstream side of the conveying direction so that the in-feed roller 8 rotates in a clockwise direction, and as shown in FIG. 10, the first dancer unit 17 falls down to the lower limit position from the control position, and therefore tension cannot be applied to the recording medium W.

Furthermore, during the period A, the out-feed roller 14 also cannot rotate by itself, and therefore as shown in FIG. 10, as the second dancer unit 18 draws in, by gravity, the recording medium W from the upstream side or the downstream side, the first dancer unit 17 falls down to the lower limit position from the control position.

When printing stops, due to a condition of the inkjet printer 102, there are cases where there is a time lag from ending output of the 6 ppi signals to a catalyst where the sheet conveying signals become inactivated (see period B in FIG. 6).

In this case also, until the sheet conveying signals become inactivated, the electromagnetic brakes 234, 235 of the in-feed motor 231 and the out-feed motor 232 and the brakes 241, 242 of the first dancer unit 17 and the second dancer unit 18 are turned off. Thus, as the hanging down first dancer unit 17 draws in, by gravity, the recording medium W from the air loop part AL that does not have tension in the conveying direction, the in-feed roller 8 rotates in a clockwise direction, and as shown in FIG. 10, the first dancer unit 17 falls down to the lower limit position from the control position, and therefore tension cannot be applied to the recording medium W at the time when starting the next conveying operation.

Furthermore, in the period B, the out-feed roller 14 also cannot rotate by itself, and therefore, as shown in FIG. 10, as the second dancer unit 18 draws in, by gravity, the recording medium W from the upstream side or the downstream side, the second dancer unit 18 falls down to the lower limit position from the control position.

Figure 7:
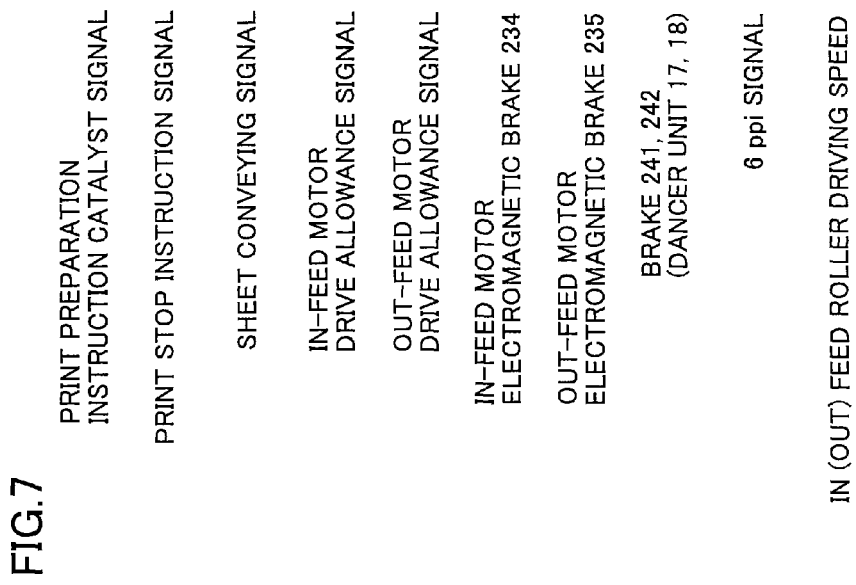
FIG. 7 is a timing chart for describing a method of solving the problem described with reference to FIG. 6.

FIG. 7 is a timing chart for describing a method of solving the problem described with reference to FIG. 6.

In the example of the above problem, by a catalyst where the inkjet printer 102 activates the sheet conveying signals, the treatment agent applying device 101 recognizes that the inkjet printer 102 has started sheet conveyance, and the electromagnetic brakes 234, 235 of the in-feed motor 231 and the out-feed motor 232 are immediately turned off and the drive allowance signals of the respective motors are activated. Instead, in this example, after the sheet conveying signals are activated, the inkjet printer 102 starts outputting the 6 ppi signals.

Then, by a catalyst where the microcomputer unit 210 (see FIG. 4) recognizes that the driving of the in-feed motor 231 and the out-feed motor 232 is to start, the electromagnetic brakes 234, 235 of the in-feed motor 231 and the out-feed motor 232 are turned off and the drive allowance signals of the in-feed motor 231 and the out-feed motor 232 are activated.

This eliminates the period A described as a problem with reference to FIG. 6, during which the electromagnetic brakes 234, 235 of the in-feed motor 231 and the out-feed motor 232 and the brakes 241, 242 of the first dancer unit 17 and the second dancer unit 18 are turned off and the driving motors of the in-feed roller 8 and the out-feed motor 232 do not have a driving force and cannot rotate by themselves. Therefore, the first dancer unit 17 and the second dancer unit 18 can be retained at the control positions without falling down.

Furthermore, when printing is stopped, in the example of the above problem, by a catalyst where the inkjet printer 102 inactivates the sheet conveying signals, the electromagnetic brakes 234, 235 of the in-feed motor 231 and the out-feed motor 232 are turned on and the drive allowance signals of the in-feed motor 231 and the out-feed motor 232 are inactivated. Instead, in this example, by a catalyst where the microcomputer unit 210 recognizes that the inkjet printer 102 is to stop outputting the 6 ppi signals, the electromagnetic brakes 234, 235 of the in-feed motor 231 and the out-feed motor 232 are turned on and the drive allowance signals of the in-feed motor 231 and the out-feed motor 232 are inactivated.

This eliminates the period B described as a problem with reference to FIG. 6, during which the electromagnetic brakes 234, 235 of the in-feed motor 231 and the out-feed motor 232 and the brakes 241, 242 of the first dancer unit 17 and the second dancer unit 18 are turned off and the driving motor of the in-feed roller 8 does not have a driving force and cannot rotate by itself. Therefore, the conveying can be stopped while the first dancer unit 17 and the second dancer unit 18 are retained at the control positions without falling down.

Figure 8:
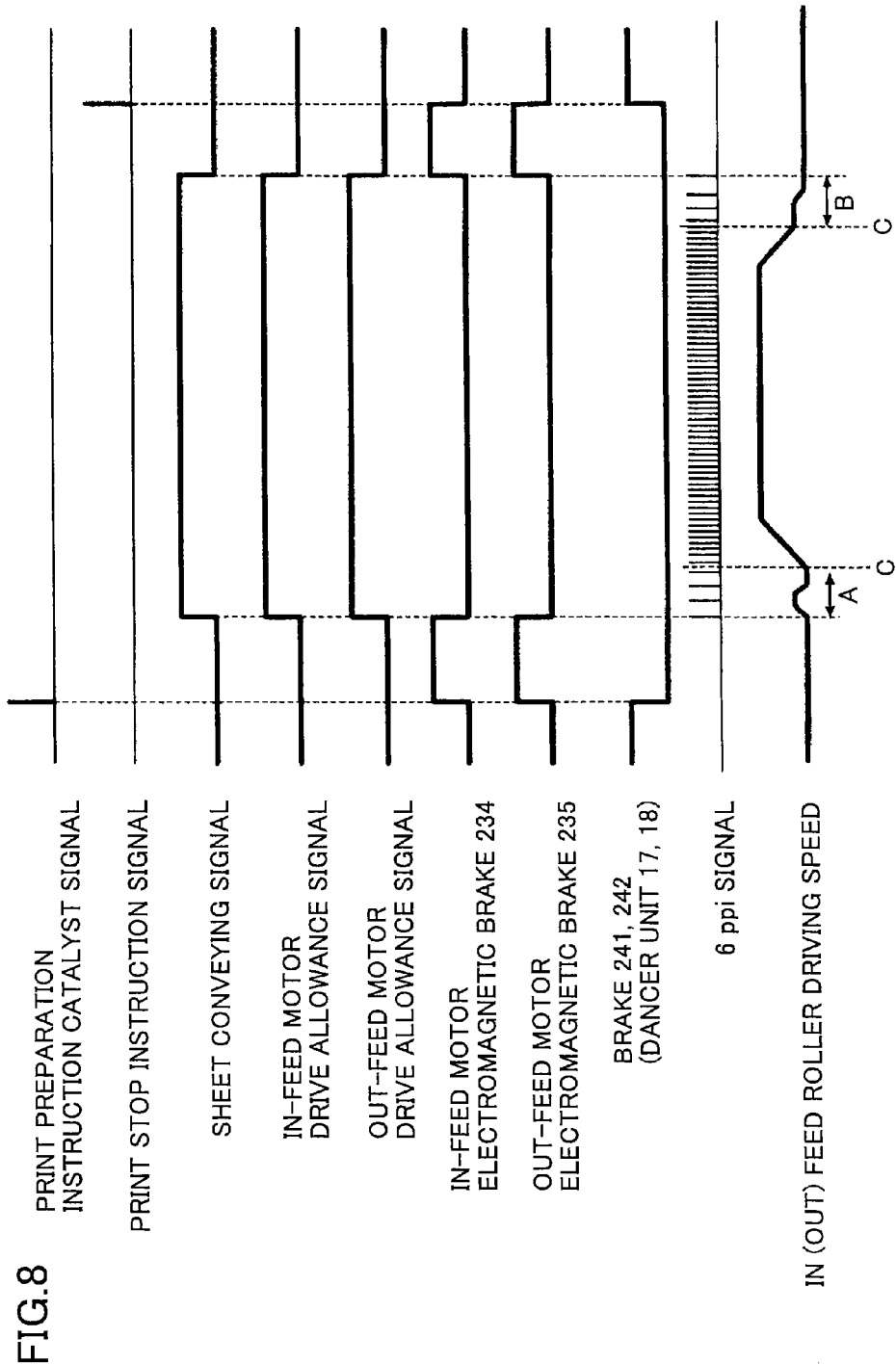
FIG. 8 is a timing chart indicating an example of convey control in which a different problem occurs.

FIG. 8 is a timing chart indicating an example of convey control in which a different problem occurs.

As described with reference to FIG. 7, by an output start catalyst of 6 ppi signals from the inkjet printer 102, the electromagnetic brakes 234, 235 of the in-feed motor 231 and the out-feed motor 232 are turned off and the drive allowance signals of the in-feed motor 231 and the out-feed motor 232 that are driving sources of the in-feed roller 8 and the out-feed roller 14 are activated. Furthermore, there is a motor having a property that the motor cannot start driving unless a drive signal (6 ppi signal), which is greater than or equal to a speed C (see FIG. 8) that is 3% with respect to a MAX speed value, is input.

In this case, during the period A for waiting until the in-feed motor 231 and the out-feed motor 232 to start driving, the motors do not have a conveying force and cannot rotate by themselves. Therefore, during this period, if the electromagnetic brakes 234, 235 of the in-feed motor 231 and the out-feed motor 232 and the brakes 241, 242 of the first dancer unit 17 and the second dancer unit 18 are turned off, for example, as shown in FIG. 10, as the hanging down first dancer unit 17 draws in, by gravity, the recording medium W from the air loop part AL that does not have tension on the upstream side of the conveying direction, the in-feed roller 8 rotates in a clockwise direction, and the first dancer unit 17 falls down to the lower limit position from the control position, and therefore tension cannot be applied to the recording medium W, which is a new problem.

Furthermore, during the period A, the out-feed roller 14 cannot rotate by itself, and therefore as shown in FIG. 10, as the second dancer unit 18 draws in, by gravity, the recording medium W from the upstream side or the downstream side, the first dancer unit 17 falls down to the lower limit position from the control position, which is a new problem.

When printing stops, as described above with reference to FIG. 7, by a catalyst where output of the 6 ppi signals from the inkjet printer 102 stops, the electromagnetic brakes 234, 235 of the in-feed motor 231 and the out-feed motor 232 are turned on and the drive allowance signals of the in-feed motor 231 and the out-feed motor 232 are inactivated. However, there are cases where the in-feed motor 231 and the out-feed motor 232 have a property of stopping to drive when the speed of the drive signals (6 ppi signals) becomes less than the above speed C, and the in-feed roller 8 and the out-feed roller 14 cannot rotate by themselves.

In this case also, during a period B from when driving is stopped to when the sheet conveying signals are inactivated and the electromagnetic brakes 234, 235 of the in-feed motor 231 and the out-feed motor 232 are turned on, as shown in FIG. 10, as the hanging down first dancer unit 17 draws in, by gravity, the recording medium W from the air loop part AL that does not have tension in the conveying direction, the in-feed roller 8 rotates in a clockwise direction, and the first dancer unit 17 falls down to the lower limit position from the control position, and therefore tension cannot be applied to the recording medium W at the time when starting the next conveying operation, which is a new problem.

Furthermore, in the period B, the out-feed roller 14 also cannot rotate by itself, and therefore, as shown in FIG. 10, as the second dancer unit 18 draws in, by gravity, the recording medium W from the upstream side or the downstream side, the second dancer unit 18 falls down to the lower limit position from the control position, which is a new problem.

Figure 9:
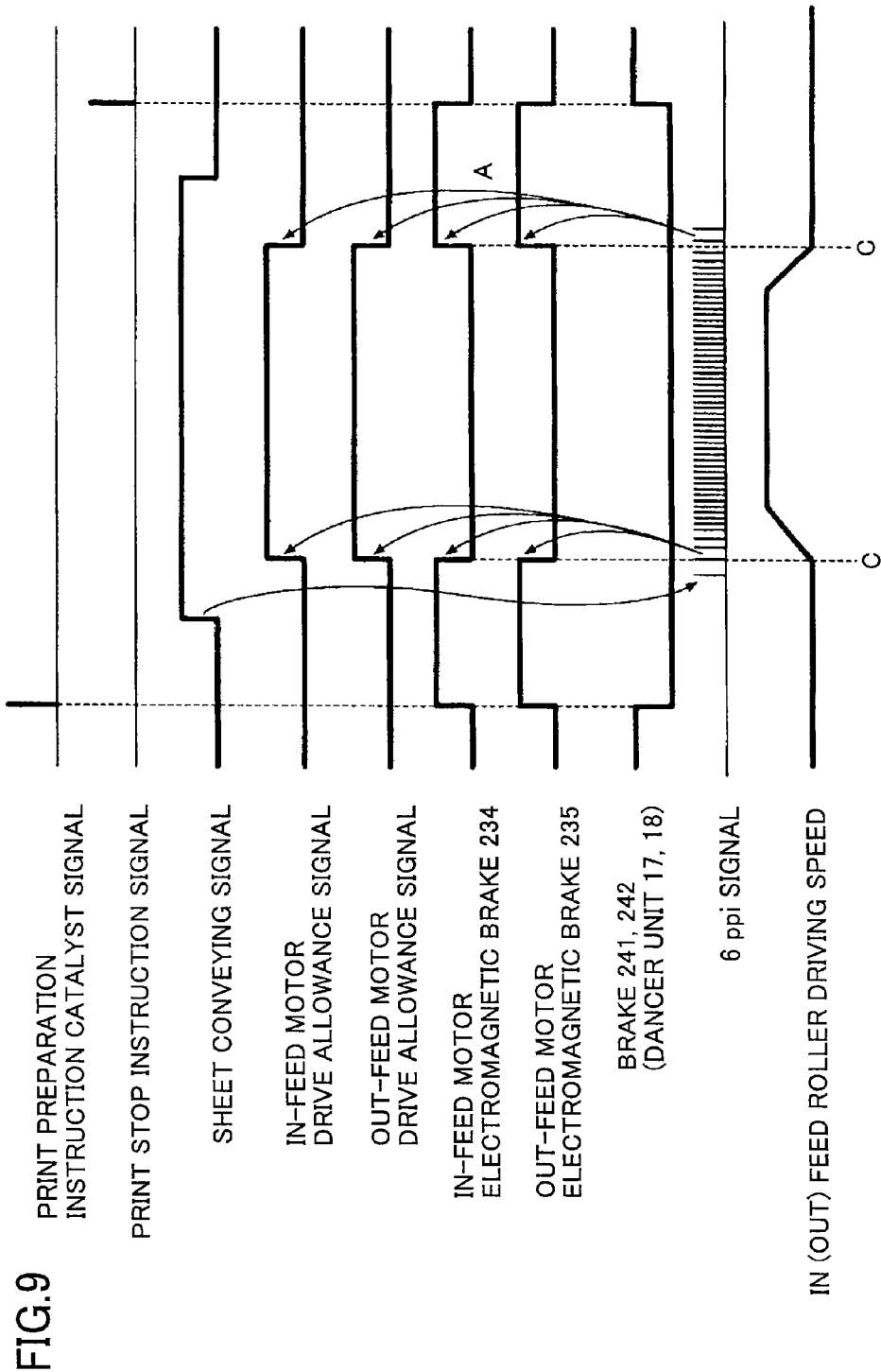
FIG. 9 is a timing chart for describing a method of solving the problem described with reference to FIG. 8.

FIG. 9 is a timing chart for describing a method of solving the problem described with reference to FIG. 8.

In the example of the above problem, by a catalyst where the inkjet printer 102 starts outputting the 6 ppi signals, the electromagnetic brakes 234, 235 of the in-feed motor 231 and the out-feed motor 232 are turned off and the drive allowance signals of the in-feed motor 231 and the out-feed motor 232 are activated. Instead, in this example, after the sheet conveying signals are activated, by a catalyst where the microcomputer unit 210 recognizes that the speed data by the 6 ppi signals output from the inkjet printer 102 becomes the speed C at which the in-feed motor 231 and the out-feed motor 232 start driving, the electromagnetic brakes 234, 235 of the in-feed motor 231 and the out-feed motor 232 are turned off, and the drive allowance signals of the in-feed motor 231 and the out-feed motor 232 are activated.

This eliminates the period A described as a problem with reference to FIG. 8, during which the electromagnetic brakes 234, 235 of the in-feed motor 231 and the out-feed motor 232 are turned off and the driving motors 231, 232 of the in-feed roller 8 and the out-feed roller 14 do not have a driving force and cannot rotate by themselves. Therefore, the first dancer unit 17 and the second dancer unit 18 can be retained at the control positions without falling down.

Furthermore, when printing is stopped, in the example of the above problem, by a catalyst where the inkjet printer 102 stops outputting the 6 ppi signals, the electromagnetic brakes 234, 235 of the in-feed motor 231 and the out-feed motor 232 are turned on and the drive allowance signals of the in-feed motor 231 and the out-feed motor 232 are inactivated. Instead, in this example, by a catalyst where the microcomputer unit 210 recognizes that the speed data by the 6 ppi signals output from the inkjet printer 102 becomes the speed C at which the in-feed motor 231 and the out-feed motor 232 lose a driving force, the electromagnetic brakes 234, 235 of the in-feed motor 231 and the out-feed motor 232 are turned on, and the drive allowance signals of the in-feed motor 231 and the out-feed motor 232 are inactivated.

This eliminates the period B described as a problem with reference to FIG. 8, during which the electromagnetic brakes 234, 235 of the in-feed motor 231 and the out-feed motor 232 and the brakes 241, 242 of the first dancer unit 17 and the second dancer unit 18 are turned off, and the driving motors 231, 232 of the in-feed roller 8 and the out-feed roller 14 do not have a driving force and cannot rotate by themselves. Therefore, the conveying can be stopped while the first dancer unit 17 and the second dancer unit 18 are retained at the control positions without falling down.

In the convey control of the convey control device for the long recording medium W having a tension applying unit such as the treatment agent applying device 101, it is possible to prevent the first dancer unit 17 and the second dancer unit 18, which are tension applying units, from falling down to a lower limit position from a predetermined control position such that tension cannot be applied to the recording medium W, and therefore the long recording medium W can be stably conveyed.

In the above embodiment, a description is given of a treatment agent applying device that applies, on the long recording medium, a treatment agent having a function of condensing the ink before the ink droplets land on the long recording medium so that the image quality is improved. However, an embodiment of the present invention is not so limited. For example, an embodiment of the present invention is also applicable to a treatment agent applying device that performs a predetermined process on the long recording medium on which an image has been printed, or to a pre-post processing device that winds in and winds out a roll type recording medium.

In the above embodiment, an inkjet printer is which is separate from the treatment agent applying device is provided on the downstream side of the treatment agent applying device in the recording medium conveying direction. Based on various signals input to the treatment agent applying device from the inkjet printer, convey control is performed inside the treatment agent applying device. However, an embodiment of the present invention is not so limited. For example, a treatment agent applying unit and an image forming unit may be provided in a single device, and convey control of the treatment agent applying unit may be performed based on various signals from the image forming unit (another member) on the downstream side in the recording medium conveying direction.

The above embodiment is applied to an image forming system; however, an embodiment of the present invention is also applicable to a convey control device for handling long objects in other technical fields.

In the above embodiment, a web type recording medium is used as a long object; however, an embodiment of the present invention is not so limited. For example, an embodiment of the present invention is also applicable to a convey control device for handling other types of long objects such as a cloth, a synthetic resin film, and a string-type object.

According to one embodiment of the present invention, a convey control device for a long object is provided, which is capable of preventing a tension applying unit from falling down to a lower limit position from a predetermined control position such that tension cannot be applied to the recording medium W at the time of starting conveying and stopping conveying, and therefore the long object can be stably conveyed.

The convey control device is not limited to the specific embodiments described herein, and variations and modifications may be made without departing from the scope of the present invention.

The present application is based on Japanese Priority Patent Application No. 2012-101382, filed on Apr. 26, 2012, the entire contents of which are hereby incorporated herein by reference.

What is claimed is:

1. A convey control device for a long object, the convey control device comprising:
an upstream side conveying unit;
a buffer unit;
a downstream side conveying unit;
a convey control unit configured to perform convey control of the long object; and
a driving source configured to drive the upstream side conveying unit and the downstream side conveying unit,
wherein the upstream side conveying unit, the buffer unit, and the downstream side conveying unit are arranged along a conveying path of the long object from a conveying direction upstream side to a conveying direction downstream side,
wherein the upstream side conveying unit and the downstream side conveying unit sandwiches and conveys the long object,
wherein the buffer unit is configured to be hung down by the long object between the upstream side conveying unit and the downstream side conveying unit and to cancel out a loosening amount of the long object with gravity of the buffer unit,
wherein the driving source restricts the driving of the upstream side conveying unit and the downstream side conveying unit,
wherein the convey control unit includes
means for determining a conveying speed of the long object according to conveying speed information of the long object output from a secondary device or a secondary member following the downstream side conveying unit,
means for starting the conveying of the long object according to the conveying speed information of the long object after a convey start instruction is output from the secondary device or the secondary member following the downstream side conveying unit, and
means for stopping the conveying of the long object according to a convey stop instruction output from the secondary device or the secondary member following the downstream side conveying unit, and
wherein the convey control device further comprises a catalyst that includes information sent from the secondary device or the secondary member following the downstream side conveying unit, the catalyst causing the convey control unit to release the restricting of the driving source and to start the convey control of the long object.

2. The convey control device according to claim 1, wherein the information expresses starting output of the conveying speed information of the long object output after receiving the convey start instruction sent from the secondary device or the secondary member following the downstream side conveying unit, when starting to convey the long object.

3. The convey control device according to claim 1, wherein the information expresses that the conveying speed information of the long object becomes greater than or equal to a minimum speed at which starting the conveying of the long object becomes possible, before receiving a convey start instruction signal sent from the secondary device or the secondary member following the downstream side conveying unit.

4. A convey control device for a long object, the convey control device comprising:
an upstream side conveying unit;
a buffer unit;
a downstream side conveying unit;
a convey control unit configured to perform convey control of the long object; and
a driving source configured to drive the upstream side conveying unit and the downstream side conveying unit,
wherein the upstream side conveying unit, the buffer unit, and the downstream side conveying unit are arranged along a conveying path of the long object from a conveying direction upstream side to a conveying direction downstream side,
wherein the upstream side conveying unit and the downstream side conveying unit sandwiches and conveys the long object,
wherein the buffer unit is configured to be hung down by the long object between the upstream side conveying unit and the downstream side conveying unit and to cancel out a loosening amount of the long object with gravity of the buffer unit,
wherein the driving source restricts the driving of the upstream side conveying unit and the downstream side conveying unit,
wherein the convey control unit includes
means for determining a conveying speed of the long object according to conveying speed information of the long object output from a secondary device or a secondary member following the downstream side conveying unit,
means for starting the conveying of the long object according to the conveying speed information of the long object after a convey start instruction is output from the secondary device or the secondary member following the downstream side conveying unit, and
means for stopping the conveying of the long object according to a convey stop instruction output from the secondary device or the secondary member following the downstream side conveying unit, and
wherein the convey control device further comprises a catalyst that includes information sent from the secondary device or the secondary member following the downstream side conveying unit, the catalyst causing the convey control unit to restrict the driving of the driving source and to stop the convey control of the long object.

5. The convey control device according to claim 4, wherein the information expresses stopping output of the conveying speed information of the long object output before receiving the convey stop instruction sent from the secondary device or the secondary member following the downstream side conveying unit, when stopping conveying the long object.

6. The convey control device according to claim 4, wherein the information expresses the conveying speed information of the long object becomes less than a minimum speed at which starting the conveying of the long object becomes possible, before receiving a convey stop instruction signal sent from the secondary device or the secondary member following the downstream side conveying, unit.

* * * * *